United States Patent [19]
Sinfelt et al.

[11] 3,904,510
[45] Sept. 9, 1975

[54] CATALYST REGENERATION PROCEDURE
[75] Inventors: John H. Sinfelt, Berkeley Heights; James L. Carter, Chatham, both of N.J.
[73] Assignee: Exxon Research & Engineering Co., Linden, N.J.
[22] Filed: Oct. 31, 1973
[21] Appl. No.: 411,192

Related U.S. Application Data
[63] Continuation-in-part of Ser. No. 388,746, Aug. 16, 1973.

[52] U.S. Cl.................................. 208/140; 252/415
[51] Int. Cl........................ C10g 35/08; B01j 11/18
[58] Field of Search..................... 252/415; 208/140

[56] References Cited
UNITED STATES PATENTS

| | | | |
|---|---|---|---|
| 3,117,076 | 1/1964 | Brennan et al. | 208/140 |
| 3,537,980 | 11/1970 | Kluksdahl | 252/415 |
| 3,554,902 | 1/1971 | Buss | 208/139 |
| 3,573,199 | 3/1971 | McCoy | 208/139 |
| 3,578,583 | 5/1971 | Buss | 208/139 |
| 3,622,520 | 11/1971 | Hayes | 252/415 |
| 3,637,524 | 1/1972 | Johnson et al. | 242/415 |
| 3,654,142 | 4/1972 | Moravel | 252/415 |
| 3,684,693 | 8/1972 | Sinfelt | 208/138 |
| 3,718,578 | 2/1973 | Buss et al. | 208/139 |
| 3,764,557 | 10/1973 | Kluksdahl | 252/415 |

*Primary Examiner*—Winston A. Douglas
*Assistant Examiner*—P. E. Konopka
*Attorney, Agent, or Firm*—J. E. Luecke; J. Dimon

[57] ABSTRACT

Supported iridium-containing hydrocarbon conversion catalysts which are at least partially deactivated due to the deposition of carbonaceous residues thereon during contact with hydrocarbons are regenerated by contacting the catalyst, prior to contact with oxygen at elevated temperature, with a chlorine-containing reagent to increase the catalyst chlorine content to at least 1.0 wt. %., based on anhydrous catalyst, and thereafter contacting the catalyst with a gaseous mixture containing oxygen, a chlorine containing reagent, and water at a temperature of about 750° to 1000°F. for a time sufficient to burn at least a portion of the carbonaceous residues from the catalyst.

15 Claims, No Drawings

CATALYST REGENERATION PROCEDURE

CROSS-REFERENCE TO RELATED APPLICATION

This application is a continuation-in-part of Ser. No. 388,746, filed Aug. 16, 1973.

BACKGROUND OF THE INVENTION

1. Field of the Invention

The present invention relates to a method for regenerating iridium-containing hydrocarbon conversion catalysts. More particularly, the present invention relates to a process for regenerating a supported iridium-containing hydrocarbon conversion catalyst that has been deactivated by the deposition of carbonaceous residues thereon during contact with a hydrocarbon feed stock at elevated temperature.

2. Description of the Prior Art

The deactivation of noble metal-containing hydrocarbon conversion catalysts due to the deposition on the catalyst of carbonaceous residues is a well known phenomenon. The problem with catalyst deactivation is particularly acute with respect to supported noble metal-containing catalysts employed in the hydroforming of naphtha feed stocks.

Numerous methods have been suggested by prior workers for the regeneration of supported noble metal catalysts which have been deactivated by the deposition of carbonaceous residues. In U.S. pat. Nos. 2,916,440, 3,243,384, 3,201,355 and 3,654,182, there are disclosed procedures utilizing gaseous mixtures containing oxygen and a halogen or halogen compound, particularly hydrogen chloride, for combustion of the carbonaceous residues. Further, in U.S. Pat. No. 3,278,419 there is disclosed a procedure for the regeneration of supported platinum catalyst involving (a) addition of halogen to the catalyst while in contact with the process feed stock and (b) burning the coke deposits from the catalyst with an oxygen-containing, halogen-free regeneration gas. The prior art regeneration procedures are not completely adequate for the regeneration of iridium-containing catalysts. The performance of an iridium-containing catalyst contacted with oxygen at temperatures in excess of about 800°F. before use is diminished, unless certain procedures are employed, prior to and during contact with oxygen at elevated temperature, to protect the catalyst. If such precautions are not taken, the iridium present in the catalyst will undergo oxidative agglomeration to form large iridium oxide crystallites, which revert to low surface area iridium crystallites on reduction. Further, when iridium is employed in conjunction with other metals in a multimetallic catalyst system, high temperature oxygen contacting serves to destroy the highly dispersed polymetallic clusters comprising atoms of iridium and the other metals. A separate agglomerated iridium oxide phase forms, and the activity of the catalyst is subsequently much lower.

SUMMARY OF THE INVENTION

This invention provides an improved technique for regenerating supported iridium-containing hydrocarbon conversion catalysts which have been deactivated by the deposition of carbonaceous residues thereon. The regeneration sequence comprises the steps of (1) contacting the deactivated catalyst, prior to exposure to oxygen at elevated temperature, with a chlorine-containing reagent in amounts sufficient to increase the catalyst chlorine content to at least 1.0 wt. % based on anhydrous catalyst, and (2) contacting the chlorine treated catalyst with a substantially sulfur-free gaseous mixture containing oxygen, a chlorine-containing reagent, and water at elevated temperature for a time sufficient to burn at least a portion of the carbonaceous deposits from the catalyst. More particularly, the regeneration procedure comprises the sequential steps of (1) contacting the deactivated catalyst during or immediately following hydrocarbon conversion operations with a chlorine-containing reagent in amounts sufficient to increase the catalyst chlorine content to at least 1.0 wt. % based on anhydrous catalyst, (2) purging the catalyst under non-oxidative conditions to remove hydrocarbons therefrom, and (3) contacting a treated catalyst with a substantially sulfur-free gaseous mixture containing minor amounts of oxygen, a chlorine-containing reagent, and water at elevated temperature for a time sufficient to burn at least a portion of the carbonaceous residues from the catalyst. Thereafter the catalyst may be returned to service without further treatment with oxygen-containing reagents.

The supported iridium-containing catalyst composites that are regenerated by the process of the present invention comprise a porous carrier or support material in combination with an iridium component and, for certain uses, a halogen component. The support component of the catalyst is preferably a porous, adsorptive material having a surface area, as determined by the Brunauer-Emmett-Teller (BET) method, of about 20 to 800, preferably 100 to 300 square meters per gram. This support material should be substantially refractory at the temperature and pressure conditions utilized in any given hydrocarbon conversion process. Useful support materials include: (a) siliconbased materials such as silica or silica gel, silicon carbide, clays, natural or synthetic silicates such as kieselguhr, kaolin, china clay, Attapulgus clay, etc.; (b) aluminosilicate zeolite materials such as naturally occurring or synthetic erionite, mordenite, faujasite, etc. that may or may not be previously converted to a hydrogen or ammonia form and reduced in soda content by virtue of an exchange reaction with various metal cations, including rare earth metal cations; (c) refractory inorganic oxides, including alumina, titanium dioxide, zinc oxide, magnesia, thoria, chromia, silica-alumina, alumina-titania, silica-zirconia, alumina-chromia, etc. and (d) mixtures of one or more of the materials referred to above.

Refractory inorganic oxide materials are preferred catalyst support materials. In general, superior results are obtained when alumina, in particular the gamma or eta forms, is employed. Alumina is the preferred catalyst support material when the catalyst is employed in naphtha reforming operations. The support materials described above are known articles of commerce and can ge prepared for use as catalyst constituents by many varied techniques. Typically, the support materials are prepared in the form of spheres, granules, powders, extrudates or pellets. The precise size or shape of the support material used is dependent upon many engineering factors not within the purview of the instant invention.

As noted above, the regeneration process of the instant invention is particularly adapted to the treatment of deactivated iridium-containing catalysts. Iridium may be the sole catalyst metal present on the support; however, iridium may also be used in combination with other Group VIII metals or metals from Groups IB, VIA or VIIA of the Periodic Table of the Elements. More specifically, the iridium may be used in conjunction with one or more additional catalyst metals selected from copper, silver, gold, iron, cobalt, nickel, tungsten, molybdenum, chromium, platinum, palladium, rhodium, ruthenium, osmium, manganese or rhenium. The catalysts may also contain germanium, tin or lead. Particularly effective naphtha reforming catalysts are combinations of iridium and platinum. Most preferably, the catalyst metals are present in the form of highly dispersed clusters of atoms of said metals.

Certain minimum amounts of iridium, alone or in combination with additional catalyst metals, should be present on the catalyst. This is particularly true with respect to catalysts employed in a naphtha reforming operation where the catalyst should contain greater than about 0.1 wt. % iridium, based upon the dry weight of the total catalyst. For other types of operations, lesser quantities of iridium may be employed. Specifically, iridium may be present on the catalyst in amounts varying from about 0.01 to about 3.0 wt. %, preferably in amounts varying from about 0.1 to about 1.0 wt. %, based upon the total weight of the dry catalyst. Typically, any additional catalyst metals, such as platinum, are present in the catalyst in amounts varying from about 0.01 to 3.0 wt. %, preferably 0.1 to 1.0 wt. %, based upon the dry weight of the catalyst. Iridium/platinum naphtha reforming catalysts having maximum effectiveness normally contain 0.15 to 1.0 wt. % each, preferably about 0.15 to 0.5 wt. % each, of iridium and platinum, based on total catalyst.

Iridium-containing catalysts may be prepared employing simple impregnation techniques. Such a catalyst may be prepared by impregnating a support material with a solution of a soluble iridium compound and soluble compounds of any additional metals to be incorporated in the catalyst. Generally, an aqueous solution of the metal compounds is used. In the case of multimetallic systems, the support material may be impregnated with the various metal-containing compounds either sequentially or simultaneously. However, it is highly desirable that the metal compounds, in the case of a polymetallic system, be impregnated on the catalyst support simultaneously to maximize the desired interaction between the metal components and thereby promote the formation of a highly dispersed polymetallic cluster structure in the final reduced form of the catalyst. The carrier material is impregnated with solutions of appropriate concentration to provide the desired quantity of metal in the finished catalyst. In the case of iridium-containing catalysts, compounds suitable for the impregnation of iridium onto the carrier include, among other, chloroiridic acid, iridium tribromide, iridium trichloride, and ammonium chloroiridate. Additional catalyst metals may be incorporated onto the support by employing compounds such as chloroplatinic acid, ammonium chloroplatinate, platinum amine salts, perrhenic acid, ruthenium trichloride, rhodium trichloride, rhodium nitrate, palladium chloride, palladium amine salts, osmium trichloride, chloroosmic acid, auric chloride, chloroauric acid, silver nitrate, copper nitrate, copper chloride, ferric nitrate, cobalt nitrate, nickel nitrate, etc. The preferred catalyst manufacturing technique involves contacting a previously prepared support, such as alumina, with an aqueous solution of an iridium compound, alone or in combination with a compound of at least one additional catalyst metal.

After impregnation of the carrier, the composite catalyst is dried at a temperature varying from about 220° to 250°F. The catalyst may be dried in air at the above stated temperatures or may be dried by treating the catalyst in a flowing stream of inert gas or hydrogen. The drying step may be followed by an additional calcination step at temperatures of about 500° to 700°F. Care must be taken to avoid contacting the catalyst at temperatures in excess of about 800°F. with air or other gases of high oxygen concentration. If the catalyst is contacted with oxygen at too high a temperature, at least a portion of the iridium present will be oxidized, with loss of surface area, to crystallites of iridium oxide. In the case of polymetallic systems, the desired polymetallic cluster structure will not be obtained on reduction.

Additional materials may be added to the iridium-containing catalyst composite to assist in the promotion of various types of hydrocarbon conversion reactions for which the catalyst might be employed. For example, the naphtha reforming activity of the catalyst is enhanced markedly by the addition of a halogen moiety, particularly a chlorine or fluorine moiety, to the catalyst. The halogen should be present in the catalyst in amounts varying from about 0.1 to 3.0 wt. %, based on the total dry weight of the catalyst. The halogen may be incorporated into the catalyst at any suitable stage in the catalyst manufacturing operation, i.e., before, during or after incorporation of the active metal component onto the support material. Halogen is often incorporated into the catalyst by impregnating the support with halogen-bearing metal compounds such as chloroiridic acid. Further amounts of halogen may be incorporated in the catalyst by contacting it with hydrogen fluoride, ammonium fluoride, hydrogen chloride, or ammonium chloride, either prior to or subsequent to the impregnation step. Other components may also be added to the catalyst composite. For example, the catalyst may be sulfided before or during use. For certain applications other than naphtha reforming, alkali or alkaline earth metal compounds may be added to the catalyst.

The iridium-containing catalyst composites may be used to promote a wide variety of hydrocarbon conversion reactions such as hydrocracking, isomerization, dehydrogenation, hydrogenation, alkylation, polymerization, cracking, and the like. The catalysts are particularly useful in promoting the dehydrogenation, isomerization, dehydrocyclization and hydrocracking reactions that occur in a naphtha hydroforming process.

In a naphtha hydroforming process (reforming) a substantially sulfur-free naphtha stream that typically contains about 15 to 80 volume % paraffins, 15 to 80 volume % naphthenes and about 2 to 20% aromatics and boiling at atmospheric pressure substantially between about 80° and 450°F., preferably between about 150° and 375°F., is contacted with the iridium-containing catalyst composite in the presence of hydrogen. The reactions typically occur in a vapor phase at a temperature varying from about 650° to 1000°F., preferably about 750° to 980°F. Reaction zone pressures may vary from about 1 to 50, preferably from about 5 to 30 atmospheres. The naphtha feed stream is passed over the catalyst composite at space velocities varying from about 0.5 to 20 parts by weight of naphtha per hour per part by weight of catalyst (W/hr./W), preferably from about 1 to 10 W/hr./W. The hydrogen to hydrocarbon mole ratio within the reaction zone is maintained between about 0.5 and 20, preferably between about 1 and 10. During the reforming process, the hydrogen used may be in admixture with light gaseous hydrocarbons. In a typical operation, the catalyst is maintained as a fixed bed within a series of adiabatically operated reactors. The product stream from each reactor (except the last) in the reactor train is reheated prior to passage to the following reactor. As an alternate to the above-described process, the catalyst may be used in a moving bed in which the naphtha charge stock hydrogen and catalyst are passed in parallel through the reactor or in a fluidized system wherein the naphtha feed stock is passed in upwardly through a turbulent bed of finely divided catalyst particles. Finally, if desired, the catalyst may be simply slurried with the charge stock and the resulting mixture conveyed to the reaction zone for further reaction.

Regardless of the hydrocarbon conversion reaction in which iridium-containing catalyst composites are employed, the catalyst tends to deactivate after use due at least in part to the formation of coke or carbonaceous residues on the surface of the catalyst. The carbonaceous residues on the surface of the catalyst cover the active catalyst sites and thus decrease activity. Accordingly, it becomes necessary to remove the carbonaceous deposits from the catalyst in order to return the catalyst to an economically viable activity level.

The first step in the regeneration sequence of the present invention consists of pretreating the deactivated catalyst with a chlorine-containing reagent in an amount sufficient to increase the catalyst chlorine content to at least 1.0 wt. %, based on anhydrous catalyst, preferably to about 1.0 to 4.0 wt. %, and most preferably to about 1.0 to 2.0 wt. %. The manner in which the chlorine level of the catalyst is brought within desired limits is not critical. The chlorine-containing reagent can be introduced with the hydrocarbon feeds or hydrogen recycle gas during the operation of the process. Alternatively, the chlorine-containing reagent may be introduced in an appropriate gas stream into the reaction zone to provide the desired catalyst chlorine level after the reactors are taken off-stream. The gas may be an inert gas, such as flue gas, nitrogen, or a reformer tail gas. While the manner in which the chlorine-containing reagent is introduced into the reaction zone is not critical, it is important that the reagent be contacted with the deactivated catalyst prior to contacting the deactivated catalyst with oxygen at temperatures normally employed in regeneration, that is, temperatures in excess of about 800°F. Useful chlorine-containing reagents include elemental chlorine, hydrogen chloride, or chlorine-containing compounds that are thermally degraded to chlorine and/or hydrogen chloride at the temperature at which the catalyst is contacted with the chlorine-containing reagent. Useful chlorine-containing compounds are $C_1$–$C_4$ chlorinated hydrocarbons such as carbon tetrachloride, trichloroethylene, ethylene dichloride, t-butyl chloride, etc.

Following the chlorine pretreating operation, the reaction zone containing the iridium-containing catalyst may be purged with an inert gas to remove volatile hydrocarbons. This step may be omitted if the hydrocarbons have been purged from the reaction zone prior to or during the chlorine pretreating operation.

Thereafter, the carbonaceous residues are at least partially removed from the chlorine-treated catalyst by contacting the catalyst with a substantially sulfur-free gaseous mixture that contains minor amounts of oxygen, a chlorine-containing reagent, and water. The treating gas contains from 0.1 to about 1.0 mole % oxygen, preferably from about 0.2 to 0.4 mole % oxygen. A concentration of chlorine-containing reagent equivalent in chlorine content to 20 to 2000 ppm by volume of HCl, preferably 50 to 1000 ppm, should be maintained in the gas mixture, depending on the system pressure and concentration of water in the gas. The molar ratio of water to said equivalent HCl in the inlet gas should be below about 10:1 for burning operations conducted at temperatures greater than about 850°F. At burning temperatures of less than about 825°–850°F., the molar ratio of water to equivalent HCl in the treating gas may be greater than 10:1. In such situations, water to equivalent HCl ratios up to about 40:1 can be used. If the amount of chlorine-containing reagent in the gas is too high, i.e., more than 2000 ppm by volume of equivalent HCl at 100 psig pressure, the removal of the carbonaceous residues by burning will be inhibited to an unsatisfactory degree. Preferably the molar ratio of oxygen to chlorine-containing reagent (as equivalent HCl) in the treating gas exceeds about 5:1. Water may be added to the gas prior to contact with the deactivated catalyst; of course it is also generated in situ as a result of the coke combustion process. The desired water levels can be maintained by passing the gas through a dryer system prior to contacting it with the deactivated catalyst material. The balance of the gaseous mixture used to burn carbonaceous residues is desirably composed of inert gas constituents such as nitrogen, helium, carbon dioxide, etc.

The burning operation is conducted at temperatures less than about 1050°F., preferably at a temperature ranging from about 750° to 1000°F. Normally the burning operation is conducted at the lowest possible temperature consistent with obtaining acceptable carbonaceous residue removal. Typically, the burning operation is conducted at pressures varying from 25 to 500 psig. The burning operation is conducted for a period sufficient to remove at least a portion, preferably substantially all the carbonaceous material present on the catalyst. Depending upon the amount of coke present on the catalyst, a burning period of from about 0.5 to 24, preferably 1 to 6, hours is adequate. In a normal operation, the contacting of the catalyst with the combustion gas is continued until the temperature difference across the zone or zones containing the catalyst is less than about 5°F. and carbon dioxide formation essentially stops. At this point substantially all of the carbonaceous material has been removed from the catalyst.

The chlorine-containing reagent employed in the burning operation, which in general is convertible to hydrogen chloride and/or chlorine under burning conditions, may be added directly to the gas. Examples of useful reagents include chlorine, hydrogen chloride, $C_1$–$C_4$ chlorinated hydrocarbons, such as carbon tetrachloride, ethylene dichloride, t-butyl chloride, etc.

Following completion of the burning operation, oxygen is purged from the zone containing the catalyst by contacting the same with an inert gas stream. If desired, the system may be dried simultaneously. After the purging operation, the catalyst is normally reduced with a hydrogen containing gas at elevated temperature. In the case of a naphtha hydroforming operation, the desired reduction may be achieved during the initial on-stream operation wherein the catalyst is brought in contact with hydrogen and the naphtha feed stock. If desired, the catalyst may be sulfided by contact with a sulfur-containing reagent, such as hydrogen sulfide, prior to use. In the most preferred operation, the catalyst, following the burning operation, is reutilized in the naphtha reforming process or other conversion operation without contacting the same with an oxygen-containing gas at a temperature in excess of about 800°F.

DESCRIPTION OF THE PREFERRED EMBODIMENTS

The following examples illustrate further the regeneration process of the present invention.

EXAMPLE 1

A catalyst containing 0.3 wt. % iridium and 0.3 wt. % platinum on alumina, with a chlorine content of 0.72 wt. % and with 4.7 wt. % carbonaceous residues (coke) deposited thereon in a prior naptha reforming operation at typical reforming conditions, was contacted with a gas containing 1 mole % chlorine in nitrogen at 700°F. to add 1.0 wt. % chlorine to the catalyst. The coke was then burned at 925°F. and 100 psig using a gas mixture consisting of 0.3 mole % oxygen in nitrogen. The catalyst was contained in a 1.5 inch ceramic-lined steel tubular reactor immersed in a fluidized solids bath. A catalyst charge of 150 grams was employed. The carbon burn off step required 6 hours, and after the burn there was a residual average coke content of 0.7 wt. %. Extensive oxidation of the iridium occurred, with formation of agglomerated iridium dioxide to the extent of 50–76% depending on the position in the catalyst bed. Here percent agglomeration refers to the percentage of the initial metal component of the catalyst which exists in the form of crystallites detectable by X-ray diffraction, i.e., as crystallites greater than about 50 A in size. On subsequent reduction, a low surface area iridium phase is formed. This gives an inactive catalyst.

EXAMPLE 2

The catalyst of Example 1 was treated exactly as in Example 1 except that the gas used for burning contained 0.03 mole % chlorine (600 ppm by volume equivalent HCl). The carbon burn-off step required 6 hours, and there was a residual average coke content of 0.66 wt. % after the burn. No agglomeration of the iridium in the catalyst was observed, and the final chlorine content was 3.0 wt. %.

EXAMPLE 3

In this example a burn was carried out on the catalyst of Example 1 at 925°F. sandbath temperature and 100 psig using 0.3 mole % $O_2$ and 0.3 mole % $Cl_2$ (6000 ppm by volume equivalent HCl) in nitrogen. After the burn, it was found that only a small part of the coke had been removed from the catalyst. The residual coke amounted to 3.95 wt. %. This illustrates that the chlorine concentration must not be too high if one wishes to obtain reasonably complete combustion of the coke. Other disadvantages of this burn were that the platinum was agglomerated to an average extent of 47% and that excessive chlorine was deposited on the catalyst, i.e., 7.0 wt. %. For comparison, Example 2 was conducted with 0.03 mole chlorine and there was no damage to the iridium or platinum. Also there was only 0.66 wt. % coke left on the catalyst, and the final chlorine content of the catalyst was much lower, i.e., 3.0 wt. %.

EXAMPLE 4

In this example, a catalyst containing 0.3 wt. % Ir and 0.3 wt. % Pt on $Al_2O_3$ with associated chlorine, and containing 3.0 wt. % coke, was regenerated at 880°F. sandbath temperature and 100 psig, with $N_2$ containing 0.3 mole % $O_2$, 0.01 mole % $Cl_2$ (200 ppm by volume HCl equivalent) and 2,000 ppm by volume of $H_2O$. The coked catalyst containing about 1.0 wt. % chlorine was treated prior to the burn with a chlorine in nitrogen mixture at 700°F., to add 1.0% chlorine to the catalyst. After the burn, the catalyst showed 50% agglomeration of the iridium, and the chlorine content was 0.95 wt. %.

EXAMPLE 5

In this example, the catalyst of Example 4 was treated with $Cl_2$ in $N_2$, at 700°F., to add 1.0% $Cl_2$ to the catalyst. It was then burned at 880°F. sandbath temperature and 100 psig, using 0.3% $O_2$ and 0.01% $Cl_2$ (200 ppm by volume HCl equivalent) in nitrogen. After the burn, the catalyst showed no agglomeration of either the iridium or the platinum. The chlorine content of the catalyst after the burn was 2.1 wt. %.

EXAMPLE 6

In this example, the catalyst of Example 4 was regenerated as in Example 4, except that a chlorine concentration of 0.03 mole % (600 ppm by volume HCl equivalent) instead of 0.01 mole % was employed. After the burn, no agglomeration of iridium or platinum was detected, and the chlorine content was 1.4 wt. %. The results of Examples 4, 5 and 6 indicate that the required amount of chlorine to prevent agglomeration of the iridium during coke burnoff depends on the amount of water in the burning gas.

What is claimed is:

1. In a process for the catalytic conversion of hydrocarbons wherein a hydrocarbon feed stock is contacted with a catalyst comprising from about 0.01 to about 3.0 wt. % of an iridium component and a chlorine component contained on a refractory inorganic oxide support at conversion conditons, the catalyst having been at least partially deactivated during contact with said feed stock by the deposition of carbonaceous residues, a method for regenerating said catalyst comprising:

1. contacting said catalyst, after contact with said hydrocarbon feed stock with an oxygen-free chlorine-containing reagent in a gaseous medium from the group consisting of hydrocarbon feed, hydrogen containing gas, inert gas and mixtures thereof in an amount sufficient to increase the catalyst chlorine content to 1.0 weight percent to about 4.0 wt. %, based on anhydrous catalyst;

2. contacting said treated catalyst with a substantially sulfur-free gaseous mixture containing oxygen, a chlorine-containing reagent and water at a temperature of less than about 850°F. for a time sufficient to burn at least a substantial portion of said carbonaceous residues from said catalyst, said gaseous mixture containing 0.1 to 1.0 mole percent oxygen and a concentration of chlorine-containing reagent equivalent in chlorine content to 20 to 2000 ppm by volume of HCl, the molar ratio of water to said equivalent HCl in said gaseous mixture being greater than about 10:1 to about 40:1.

2. The process of claim 1 wherein said step (2) gaseous mixtures contain from 50 to 1000 ppm by volume of equivalent HCl.

3. The process of claim 1 wherein said catalyst additionally contains a platinum component.

4. The process of claim 1 wherein, said step (1) contacting of said catalyst with said chlorine-containing reagent is continued for a time sufficient to increase catalyst chlorine content to from 1.0 to 2.0 wt. %, based on anhydrous catalyst.

5. In a process for the catalytic conversion of a naphtha feed stock wherein a naphtha feed stock and hydrogen are contacted with a catalyst comprising from about 0.01 to about 3.0 wt. % of an iridium component and a chlorine component contained on a refractory inorganic oxide support at reforming conditions, the catalyst having been at least partially deactivated during contact with said naphtha feed stock by the deposition of carbonaceous residues, a method for regenerating said catalyst comprising (1) contacting said catalyst, after contact with said naphtha feed stock with an oxygen-free chlorine-containing reagent in a gaseous medium from the group consisting of hydrocarbon feed, hydrogen containing gas, inert gas and mixtures thereof in amounts sufficient to increase catalyst chlorine content to about 1.0 to about 4.0 wt. %, based on anhydrous catalyst, and (2) contacting said treated catalyst with a substantially sulfur-free gaseous mixture containing oxygen, a chlorine-containing reagent, and water at a temperature of less than about 850°F. for a time sufficient to burn at least a substantial portion of said carbonaceous residues from said catalyst, said gaseous mixture containing 0.1 to 1.0 mole percent oxygen and a concentration of chlorine-containing reagent equivalent in chlorine content to 20 to 2000 ppm by volume of HCl, the molar ratio of water to said equivalent HCl in said gaseous mixture being greater than about 10:1 to about 40:1.

6. The process of claim 5 wherein said step (2) gaseous mixture contains from 50 to 1000 ppm by volume of equivalent HCl.

7. The process of claim 5 wherein said catalyst additionally contains a platinum component.

8. The process of claim 5 wherein said step (1) contacting is continued for a time sufficient to increase catalyst chlorine content to between about 1.0 to 2.0 wt. %, based on anhydrous catalyst.

9. The process of claim 5 wherein the molar ratio of oxygen to equivalent HCl in said step (2) gaseous mixture is greater than about 5:1.

10. In a process for the catalytic reforming of naphtha feed stocks wherein said naphtha feed stock and hydrogen are contacted in a reaction zone with a catalyst comprising from about 0.01 to about 3.0 wt. % of an iridium component and a chlorine component contained on a refractory support at naphtha reforming conditions, the catalyst having been at least partially deactivated during contact with said naphtha feed stock and hydrogen by the deposition of carbonaceous residues thereon, a method for regenerating said catalyst comprising:

1. during the operation of said process, introducing into said reaction zone with said naphtha feed stock and hydrogen an oxygen-free chlorine-containing reagent in amounts sufficient to increase catalyst chlorine content to 1.0 to about 4.0 wt. %, based on anhydrous catalyst, and thereafter discontinuing the contacting of said catalyst with said naphtha feed stock;

2. contacting said catalyst with an inert gas to purge hydrogen and naphtha feed stock from contact with said catalyst; and 3. contacting said treated catalyst with a substantially sulfur-free gaseous mixture containing oxygen, a chlorine-containing reagent and water at a temperature of less than about 850°F. for a time sufficient to burn at least a substantial portion of said carbonaceous residues from said catalyst, said gaseous mixture containing 0.1 to 1.0 mole percent oxygen and a concentration of chlorine-containing reagent equivalent in chlorine content to 50 to 1000 ppm by volume of HCl, the molar ratio of water to said equivalent HCl in said gaseous mixture being greater than about 10:1 to about 40:1.

11. The process of claim 10 wherein said step (3) gaseous mixture contains from about 100 to 500 ppm by volume of equivalent HCl.

12. The process of claim 10 wherein the molar ratio of oxygen to equivalent HCl in said step (3) gaseous mixture is greater than about 5:1.

13. The process of claim 10 wherein said catalyst additionally contains from about 0.1 to about 3.0 wt.% of platinum.

14. The process of claim 10 wherein the amount of iridium present on the catalyst is at least about 0.1 wt. %.

15. The process of claim 10 wherein said step (1) contacting is continued for a time sufficient to increase catalyst chlorine content to between about 1.0 to 2.0 wt. %, based on anhydrous catalyst.

* * * * *